United States Patent
Oyobe et al.

(10) Patent No.: US 9,236,736 B2
(45) Date of Patent: Jan. 12, 2016

(54) POWER SUPPLY SYSTEM AND METHOD FOR CONTROLLING THE SAME

(75) Inventors: Hichirosai Oyobe, Nagoya (JP);
Makoto Nakamura, Okazaki (JP);
Munehiro Kamiya, Anjo (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 134 days.

(21) Appl. No.: 14/347,102

(22) PCT Filed: Sep. 27, 2011

(86) PCT No.: PCT/JP2011/071987
§ 371 (c)(1),
(2), (4) Date: Mar. 25, 2014

(87) PCT Pub. No.: WO2013/046314
PCT Pub. Date: Apr. 4, 2013

(65) Prior Publication Data
US 2014/0225430 A1    Aug. 14, 2014

(51) Int. Cl.
*H02J 1/10* (2006.01)
*B60L 7/14* (2006.01)
*B60L 11/12* (2006.01)
*B60L 11/14* (2006.01)
*B60L 15/20* (2006.01)
*H02M 3/158* (2006.01)
*B60L 11/18* (2006.01)
*H02J 1/08* (2006.01)
*H02J 1/00* (2006.01)

(52) U.S. Cl.
CPC ... *H02J 1/10* (2013.01); *B60L 7/14* (2013.01); *B60L 11/123* (2013.01); *B60L 11/14* (2013.01); *B60L 11/18* (2013.01); *B60L 11/1861* (2013.01); *B60L 15/2009* (2013.01); *H02J 1/08* (2013.01); *H02M 3/1582* (2013.01); *B60L 2210/12* (2013.01); *B60L 2210/14* (2013.01); *B60L 2210/30* (2013.01); *B60L 2210/40* (2013.01); *B60L 2220/14* (2013.01); *B60L 2240/421* (2013.01); *B60L 2240/423* (2013.01); *B60L 2240/429* (2013.01); *B60L 2240/547* (2013.01); *B60L 2240/549* (2013.01); *B60L 2270/20* (2013.01); *H02J 2001/008* (2013.01); *Y02T 10/6217* (2013.01); *Y02T 10/642* (2013.01); *Y02T 10/7005* (2013.01); *Y02T 10/705* (2013.01); *Y02T 10/7044* (2013.01); *Y02T 10/7077* (2013.01); *Y02T 10/7225* (2013.01); *Y02T 10/7233* (2013.01); *Y02T 10/7241* (2013.01); *Y02T 10/7275* (2013.01); *Y10T 307/549* (2015.04)

(58) Field of Classification Search
CPC ........................................................ H02J 1/10
USPC .................................................. 307/9.1, 10.1
See application file for complete search history.

(56) References Cited

U.S. PATENT DOCUMENTS

| 5,774,347 A | 6/1998 | Nakanishi | |
| 2010/0270095 A1* | 10/2010 | Shono | E02F 9/2246 180/65.29 |
| 2012/0049772 A1* | 3/2012 | Moussaoui | H02M 3/1588 318/376 |

FOREIGN PATENT DOCUMENTS

| EP | 2117106 A1 | 11/2009 |
| JP | H08-223907 A | 8/1996 |

(Continued)

*Primary Examiner* — Fritz M Fleming
(74) *Attorney, Agent, or Firm* — Sughrue Mion, PLLC

(57) ABSTRACT

A power supply system that supplies electric power to a load includes a first power storage device, a second power storage device, a power line for transmitting electric power input and output to and from the load, a converter for executing bidirectional DC voltage conversion between the first power storage device and the power line, and a switch connected between the second power storage device and the power line. When the switch is OFF, the control device performs voltage control of the converter so that a voltage value of the power line becomes a voltage command value, and when the switch is ON, the control device performs current control of the converter so that a current value of the first power storage device becomes a current command value.

6 Claims, 7 Drawing Sheets

(56) References Cited

FOREIGN PATENT DOCUMENTS

| JP | 2007-135375 A | 5/2007 |
| JP | 2009-89536 A | 4/2009 |
| JP | 2009-159663 A | 7/2009 |
| JP | 2010068576 A | 3/2010 |
| JP | 2010-206912 A | 9/2010 |
| JP | 2010-288346 A | 12/2010 |
| JP | 2011-125144 A | 6/2011 |

* cited by examiner

POWER SUPPLY SYSTEM AND METHOD FOR CONTROLLING THE SAME

CROSS REFERENCE TO RELATED APPLICATIONS

This application is a National Stage of International Application No. PCT/JP 2011/071987 filed Sep. 27, 2011, the contents of which are incorporated herein by reference in their entirety.

TECHNICAL FIELD

This invention relates to a power supply system and a method for controlling the power supply system, and more particularly to controlling of a power supply system on which a plurality of power storage devices are mounted.

BACKGROUND ART

In a power supply system applied to an electric powered vehicle, a power conversion apparatus that converts output electric power of a power storage device mounted on the vehicle into electric power for driving a drive motor is configured with a combination of a converter that can step-up the output voltage of the power storage device, and an inverter that converts output DC voltage of the converter into AC voltage and applies the AC voltage to the inverter.

Japanese Patent Laying-Open No. 2009-159663 (PTD 1) discloses a power supply system that includes a plurality of power storage devices, and a plurality of converters provided between DC power lines connected to inverters and the plurality of power storage devices, respectively. In the power supply system described in PTD 1, one of two converters is controlled in accordance with voltage control for bringing a voltage value of a DC power line to a prescribed voltage target value, while the other converter is controlled in accordance with current control for bringing the charge and discharge current of a corresponding power storage device to a prescribed current target value.

CITATION LIST

Patent Document

PTD 1: Japanese Patent Laying-Open No. 2009-159663
PTD 2: Japanese Patent Laying-Open No. 2010-288346
PTD 3: Japanese Patent Laying-Open No. 2010-206912

SUMMARY OF INVENTION

Technical Problem

In the power supply system described in PTD 1 described above, a converter for controlling charge and discharge power of each power storage device is provided for each power storage device associated with the converter. This allows charge and discharge into and from each power storage device to be performed independently.

However, upon charge and discharge into and from each power storage device, power loss occurs in the converter. Moreover, in order to extend the mileage of an electric powered vehicle, it is desirable to increase the number of power storage devices mounted to achieve an increased charge and discharge capacity of the power storage devices. This, however, also necessitates increasing the number of converters, leading to an increase in power loss, and an increase in size and costs of the power supply system. It is therefore necessary to construct a mechanism for making effective use of a plurality of power storage devices, while ensuring the function of variable control of DC voltage by converters.

Accordingly, this invention was made to solve the problems as described above, and an object of the invention is to simply and efficiently configure a power supply system on which a plurality of power storage devices are mounted, while ensuring the function of variable control of DC voltage.

Solution to Problem

In accordance with one aspect of this invention, a power supply system that supplies electric power to a load includes a first power storage device, a second power storage device, a power line for transmitting electric power input and output to and from a load, a converter for executing bidirectional DC voltage conversion between the first power storage device and the power line, a switch connected between the second power storage device and the power line, and a control device that controls ON/OFF of the switch and the converter. When the switch is OFF, the control device performs voltage control of the converter so that a voltage value of the power line becomes a voltage command value, and when the switch is ON, the control device performs current control of the converter so that a current value of the first power storage device becomes a current command value.

Preferably, the control device includes a switching unit that switches ON and OFF of the switch in accordance with an operating state of the load, a voltage control unit that performs voltage control of the converter in accordance with an output of a voltage feedback control element including at least an integral element that integrates a deviation of the voltage value of the power line from the voltage command value, and a current control unit that performs current control of the converter in accordance with an output of a current feedback control element including at least an integral element that integrates a deviation of the current value of the first power storage device from the current command value. When switching the switch from ON to OFF, the voltage control unit takes over from the current control unit the output of the integral element in the current feedback control element, as an initial value of the integral element in the voltage feedback control element.

Preferably, when switching the switch from OFF to ON, the current control unit takes over from the voltage control unit the output of the integral element in the voltage feedback control element, as an initial value of the integral element in the current feedback control element.

Preferably, the voltage control unit includes a voltage control calculation unit that performs a proportional integral calculation of the deviation of the voltage value of the power line from the voltage command value, and outputs a calculated control amount as the current command value, and a current control calculation unit that performs a proportional integral calculation of the deviation of the current value of the first power storage device from the current command value output from the voltage control calculation unit, and outputs a calculated control amount as a duty ratio command value to the converter. When the switch is ON, the current control calculation unit is configured to receive the current command value set in accordance with an electric power target value to be shared by the first power storage device, in place of the current command value output from the voltage control calculation unit, thereby functioning as the current control unit.

Preferably, the load includes an electric motor that generates vehicle driving force by receiving electric power supplied from the power supply system. The voltage control unit calculates a minimum required voltage of the power line in accordance with a torque and a rotational speed of the electric motor and sets the voltage command value in a range not lower than the minimum required voltage. The current control unit calculates required electric power of the electric motor in accordance with the torque and the rotational speed of the electric motor and determines an electric power target value to be shared by the first power storage device in accordance with the required electric power of the electric motor, and sets the current target value by dividing the electric power target value by a voltage of the first power storage device.

In accordance with another aspect of this invention, in a method for controlling a power supply system that supplies electric power to a load, the power supply system includes a first power storage device, a second power storage device, a power line for transmitting electric power input and output to and from a load, a converter for executing bidirectional DC voltage conversion between the first power storage device and the power line, and a switch connected between the second power storage device and the power line. A controlling method includes the step of, when the switch is OFF, performing voltage control of the converter so that a voltage value of the power line becomes a voltage command value, and when the switch is ON, performing current control of the converter so that a current value of the first power storage device becomes a current command value.

Advantageous Effects of Invention

According to the present invention, in the power supply system on which a plurality of power storage devices are mounted, even though a converter is provided only for some power storage devices, electric power can be supplied to a load through cooperative use of the plurality of power storage devices. Consequently, electric power can be supplied to the load with the effective use of the plurality of power storage devices, so that the power supply system can be configured to be smaller and efficiently at low cost.

DESCRIPTION OF EMBODIMENTS

Figure 1:
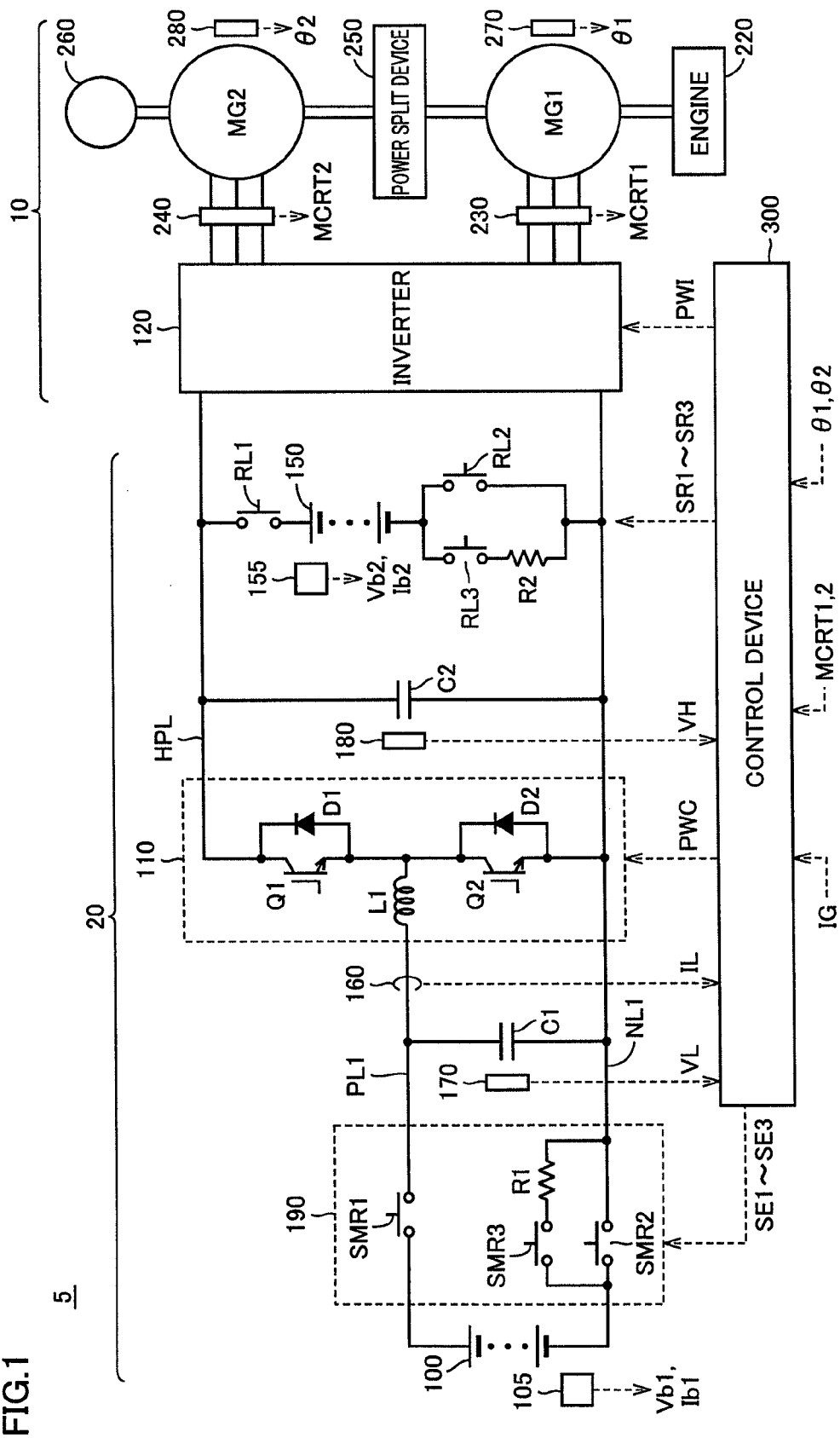
FIG. 1 is a schematic block diagram of an electric powered vehicle to which a power supply system according to an embodiment of the present invention is applied.

Embodiments of this invention will hereinafter be described in detail, referring to the drawings. In the drawings, the same or corresponding portions are indicated by the same characters.

[Basic Structure of Vehicle]

FIG. 1 is a schematic block diagram of an electric powered vehicle to which a power supply system according to an embodiment of the present invention is applied.

Referring to FIG. 1, in the embodiment of the present invention, a case where the drive system that generates driving force of an electric powered vehicle 5 corresponds to a load 10 will be described by way of example. Electric powered vehicle 5 runs by transmitting driving force generated with electric power supplied to load 10 from a power supply system 20 to a driving wheel 260. Moreover, during regeneration, electric powered vehicle 5 causes electric power to be generated from kinetic energy with load 10, and recovers the power into power supply system 20.

Electric powered vehicle 5 is typically a hybrid vehicle, which includes an internal combustion engine (engine) 220 and electric motors (MG: Motor Generator), and runs with driving forces from the respective components controlled at an optimum ratio. A plurality of (two, for example) power storage devices for supplying electric power to these motor generators are mounted on electric powered vehicle 5. During start-up of the system of electric powered vehicle 5, these power storage devices can be charged by receiving mechanical power generated by the operation of engine 220, and during stoppage of the system of electric powered vehicle 5, they can be charged by being electrically connected to a power supply external to the vehicle via a connection portion not illustrated.

Note that in the present embodiment, an example in which electric powered vehicle 5 includes two motor generators and inverters corresponding thereto will be described; however, the present invention is also applicable to a case where electric powered vehicle 5 includes one motor generator and an inverter, and a case where three or more motor generators and inverters.

Electric powered vehicle 5 includes load 10, power supply system 20, and control device 300. Load 10 includes an inverter 120, motor generators MG1, MG2, a power split device 250, an engine 220, and driving wheel 260.

Each of motor generators MG1, MG2 is an AC rotating electric machine, and is, for example, a permanent magnet type synchronous motor that includes a rotor in which a permanent magnet is embedded, and a stator having a three-phase coil arranged in a Y-connection at the neutral point.

Output torque of motor generators MG1, MG2 is transmitted to driving wheel 260 via power split device 250, whereby electric powered vehicle 5 is run. At the time of regenerative braking of electric powered vehicle 5, motor generators MG1, MG2 can generate electric power by rotational force of driving wheel 260. The generated electric power is then converted by a converter 110 and inverter 120 into electric power for charging power storage device(s) 100 and/or 150.

Motor generators MG1, MG2 are also coupled to engine 220 via power split device 250. Then, motor generators MG1, MG2, and engine 220 are cooperatively operated by control device 300, whereby required vehicle driving force is generated. Moreover, motor generators MG1, MG2 can generate electric power by rotation of engine 220, and power storage device 100 and/or 150 can be charged with this generated electric power. Note that in the present embodiment, motor generator MG2 is used mainly as an electric motor for driving wheel 260, and motor generator MG1 is used mainly as a power generator driven by engine 220. That is, motor generator MG2 corresponds to an "electric motor" for generating vehicle driving force.

Power split device 250 is configured to include a planetary gear mechanism (planetary gear) for splitting mechanical power of engine 220 between driving wheel 260 and motor generator MG1.

Current sensors 230, 240 detect motor currents (namely, inverter output currents) MCRT1, MCRT2 flowing in motor generators MG1, MG2, respectively, and output the detected motor currents to control device 300. Note that since the sum of instantaneous values of currents iu, iv, and iw of U-, V-, and W-phases is zero, current sensors 230, 240 may be disposed to detect the motor currents of two phases of U-, V-, and W-phase (for example, V-phase current iv and W-phase current iw).

Rotation angle sensors (for example, resolvers) 270, 280 detect rotation angles $\theta 1$ and $\theta 2$ of motor generators MG1, MG2, respectively, and transmit the detected rotation angles $\theta 1$ and $\theta 2$ to control device 300. At control device 300, rotational speeds and angular velocities of motor generators MG1, MG2 can be calculated based on rotation angles $\theta 1$, $\theta 2$. Note that the provision of rotation angle sensors 270, 280 may be omitted by using control device 300 to directly calculate rotation angles $\theta 1$, $\theta 2$ from the motor voltages and currents.

Inverter 120 carries out bidirectional power conversion between DC electric power between a power supply line HPL and a ground line NL1, and AC electric power input and output to and from motor generators MG1 and MG2. That is, power supply line HPL corresponds to a "power line" for transmitting electric power input and output to and from motor generators MG1 and MG2.

Inverter 120 includes a first inverter for driving motor generator MG1 and a second inverter for driving motor generator MG2, although not illustrated. First inverter mainly converts AC electric power generated by motor generator MG1 with the output of engine 220 into DC electric power, in response to a control signal PWI from control device 300, and supplies the DC electric power to power supply line HPL and ground line NL1. At this time, converter 110 is controlled by control device 300 to operate as a step-down circuit. In this way, during running of the vehicle as well, power storage device 100 and/or power storage device 150 can be actively charged with the output of engine 220.

At the time of starting engine 220, the first inverter also converts DC electric power from power storage device 100 and power storage device 150 into AC electric power, in accordance with control signal PWI from control device 300, and supplies the AC electric power to motor generator MG1. Engine 220 can thus start motor generator MG1 as a starter.

The second inverter converts DC electric power supplied via power supply line HPL and ground line NL1 into AC electric power, in accordance with control signal PWI from control device 300, and supplies the AC electric power to motor generator MG2. Motor generator MG2 thus generates driving force for electric powered vehicle 5.

Meanwhile, at the time of regenerative braking of electric powered vehicle 5, motor generator MG2 generates AC electric power along with deceleration of driving wheel 260. At this time, the second inverter converts AC electric power generated by motor generator MG2 into DC electric power, in response to control signal PWI from control device 300, and supplies the DC electric power to power supply line HPL and ground line NL1. Power storage device 100 and/or power storage device 150 are/is thus charged during deceleration or running downhill.

Power supply system 20 includes power storage device 100 corresponding to "a first power storage device", power storage device 150 corresponding to "a second power storage device", a system main relay 190, relays RL1 to RL3 and a resistance R2, converter 110, and smoothing capacitors C1, C2.

Each of power storage devices 100, 150 is a rechargeable power storage element, and typically adopts a secondary battery such as a lithium ion battery or a nickel-metal hydride battery. Hence, power storage device 100 and power storage device 150 will hereinafter also be referred to as battery 100 and battery 150, respectively. It is noted that each of power storage devices 100, 150 may also be constituted by a power storage element other than a battery, such as an electric double layer capacitor, or of a combination of a battery and a power storage element other than a battery.

Moreover, power storage devices 100 and 150 may be constituted by power storage devices of the same type or different types.

Each of batteries 100 and 150 is constituted by a plurality of battery cells connected in series. That is, the rated value of the output voltage of each of batteries 100 and 150 depends on the number of the battery cells connected in series.

Battery 100 is provided with a battery sensor 105 for detecting battery voltage Vb1 and battery current Ib1. Similarly, battery 150 is provided with a battery sensor 155 for detecting battery voltage Vb2 and battery current Ib2. Detection values from battery sensors 105, 155 are transmitted to control device 300. System main relay 190 includes relays SMR1 to SMR3 and a resistance R1.

Relays SMR1, SMR2 are inserted through power supply line PL1 and ground line NL1, respectively. Relay SMR3 is connected in parallel with relay SMR2, and connected in series with resistance R1. That is, a circuit in which relay SMR3 and resistance R1 are connected in series is connected in parallel with relay SMR2. Relays SMR1 to SMR3 are controlled to be turned ON (closed)/OFF (opened) in response to relay control signals SE1 to SE3 given from control device 300.

Relay RL1 is connected between a power supply line HPL and a positive electrode terminal of power storage device 150. Relay RL2 is connected between a negative electrode terminal of power storage device 150 and ground line NL1. Relay RL3 is connected in parallel with relay RL2 and connected in series with resistance R2. That is, a circuit in which relay RL3 and resistance R2 are connected in series is connected in parallel with relay RL2. Relays RL1 to RL3 are controlled to be turned ON (closed)/OFF (opened) in response to relay control signals SR1 to SR3 given from control device 300. Relay RL1 is used as a representative example of a "switch" that is capable of disconnecting the electrical connection between power storage device 150 and power supply line HPL. That is, a switch of any type can be adopted in place of relay RL1.

Converter 110 is configured to execute bidirectional DC voltage conversion between power storage device 100 and power supply line HPL that transmits a DC link voltage of inverter 120. That is, the input/output voltage of power storage device 100 and the DC voltage between power supply line HPL and ground line NL1 are bidirectionally stepped up or down.

Specifically, converter 110 includes a reactor L1 having one end connected to power supply line PL1, switching elements Q1, Q2 connected in series between power supply line HPL and ground line NL1, and diodes D1, D2 connected in parallel with switching elements Q1, Q2, respectively. As the switching elements, IGBTs (Insulated Gate Bipolar Transistors), bipolar transistors, MOSFETs (Metal Oxide Semiconductor Field Effect Transistors), or GTOs (Gate Turn Off Thyristors), for example, are typically used. In the present embodiment, a case where IGBTs are used as the switching elements is described as an example.

The other end of reactor L1 is connected to the emitter of switching element Q1 and the collector of switching element Q2. The cathode of diode D1 is connected to the collector of switching element Q1, and the anode of diode D1 is connected to the emitter of switching element Q1. The cathode of diode D2 is connected to the collector of switching element Q2, and the anode of diode D2 is connected to the emitter of switching element Q2.

Switching elements Q1, Q2 are controlled to be turned ON or OFF by a control signal PWC from control device 300.

Smoothing capacitor C1 is connected between power supply line PL1 and ground line NL1, and reduces voltage fluctuations between power supply line PL1 and ground line NL1. A voltage sensor 170 detects a voltage VL across the terminals of smoothing capacitor C1, and outputs the detected voltage to control device 300. Converter 110 steps up the voltage across the terminals of smoothing capacitor C1. A current sensor 160 is inserted through power supply line PL1, and detects a current (equivalent to the current involving charge and discharge of power storage device 100) IL flowing in reactor L1, and outputs the detected current IL to control device 300. It is noted that current sensor 160 is not indispensable, and current IL may be replaced with battery current Ib1 detected by battery sensor 105 provided for power storage device 100.

A smoothing capacitor C2 is connected between power supply line HPL and ground line NL1, and reduces voltage fluctuations between power supply line HPL and ground line NL1. That is, smoothing capacitor C2 smoothes the voltage stepped up by converter 110. A voltage sensor 180 detects a voltage VH across the terminals of smoothing capacitor C2, and outputs the detected voltage to control device 300. Voltage VH (that is, the DC-side voltage of inverter 120) across the terminals of smoothing capacitor C2 will hereinafter be also referred to as "system voltage VH".

Control device 300 includes a CPU (Central Processing Unit), memory, and an input/output buffer, all of which are not illustrated, and controls converter 110 and inverter 120. It is noted that such control can be performed not only by software processing, but also by dedicated hardware (electronic circuit) constructed therefor.

Control device 300 receives detection values of motor currents MCRT1 and MCRT2 flowing in motor generators MG1, MG2, respectively, detected by current sensors 230, 240. Control device 300 receives detection values of rotation angles θ1, θ2 of motor generators MG1, MG2 detected by rotation angle sensors 270, 280. Control device 300 also receives detection values of voltages VL, VH across smoothing capacitors C1, C2 detected by voltage sensors 170, 180, and a detection value of current IL involving charge and discharge of power storage device 100 detected by current sensor 160. Control device 300 also receives an ignition signal IG indicating the ON/OFF state of an ignition switch that is not illustrated.

Control device 300 generates control signal PWC of converter 110, based on voltages VL, VH across smoothing capacitors C1, C2. Control device 300 then causes converter 110 to perform a step-up or step-down operation, by driving switching elements Q1, Q2 of converter 110 with control signal PWC.

Control device 300 also generates a control signal PWI for driving inverter 120, based on motor currents MCRT1, MCRT2 flowing in motor generators MG1, MG2, respectively, detected by current sensors 230, 240, and rotation angles θ1, θ2 of motor generators MG1, MG2 detected by rotation angle sensors 270, 280. Control device 300 then converts AC electric power for driving motor generators MG1, MG2 into DC electric power supplied from converter 110, by driving switching elements of inverter 120 with control signal PWI.

Control device 300 generates relay control signals SE1 to SE3 based on ignition signal IG. Control device 300 then controls ON/OFF of relays SMR1 to SMR3 of system main relay 190 with relay control signals SE1 to SE3. Specifically, when ignition signal IG is switched from the OFF state to the ON state by a driver turning ON the ignition switch, control device 300 first turns ON relays SMR1, SMR3 with relay SMR2 being kept in the OFF state. At this time, a portion of the current is consumed by resistance R1 to reduce the current flowing into smoothing capacitor C1, thereby preventing inrush current into smoothing capacitor C1. Thereafter, upon completion of precharge of smoothing capacitor C1, relay SMR2 is turned ON, and relay SMR3 is subsequently turned OFF.

Control device 300 generates relay control signals SR1 to SR3, based on operating states of motor generators MG1, MG2, and a detection value of each sensor. Control device 300 then controls ON/OFF of relays RL1 to RL3 with relay control signals SR1 to SR3. Specifically, when power storage device 150 is electrically connected to power supply line HPL, control device 300 first turns ON relays RL1, RL3 with relay RL2 being kept in the OFF state. At this time, a portion of the current is consumed by resistance R2 to reduce the current flowing into smoothing capacitor C2, thereby preventing inrush current into smoothing capacitor C2. Thereafter, upon completion of precharge of smoothing capacitor C2, relay RL2 is turned ON, and relay RL3 is subsequently turned OFF.

As described above, power supply system 20 according to the embodiment of the present invention is configured to include a plurality of power storage devices 100 and 150. Power storage device 150 is directly electrically connected to power supply line HPL, without converter 110 being interposed therebetween. Therefore, when relays RL1, RL2 are ON, system voltage VH cannot be increased over battery voltage Vb2.

On the other hand, power storage device 100 is connected to power supply line HPL with converter 110 being interposed therebetween. Even while battery voltage Vb1 is lower than system voltage VH, therefore, electric power can be supplied to power supply line HPL from power storage device 100, and power storage device 100 can be charged with the electric power on power supply line HPL.

Thus, the rated value of the output voltage of power storage device 100 is preferably set to be lower than the rated value of the output voltage of power storage device 150. In this way, even if the number of battery cells connected in series at power storage device 100 is reduced, power storage devices 100 and 150 can be used in parallel.

Next, a relation between the operating states of motor generators MG1, MG2 and system voltage VH will be described in detail.

In order to smoothly drive motor generators MG1, MG2, it is necessary to appropriately set system voltage VH in accordance with operating points of motor generators MG1, MG2, specifically, in accordance with rotational speed and torque. First, since there is a certain limitation on a modulation factor of power conversion at inverter 120, with respect to system voltage VH, there is an upper limit torque that can be output.

Figure 2:
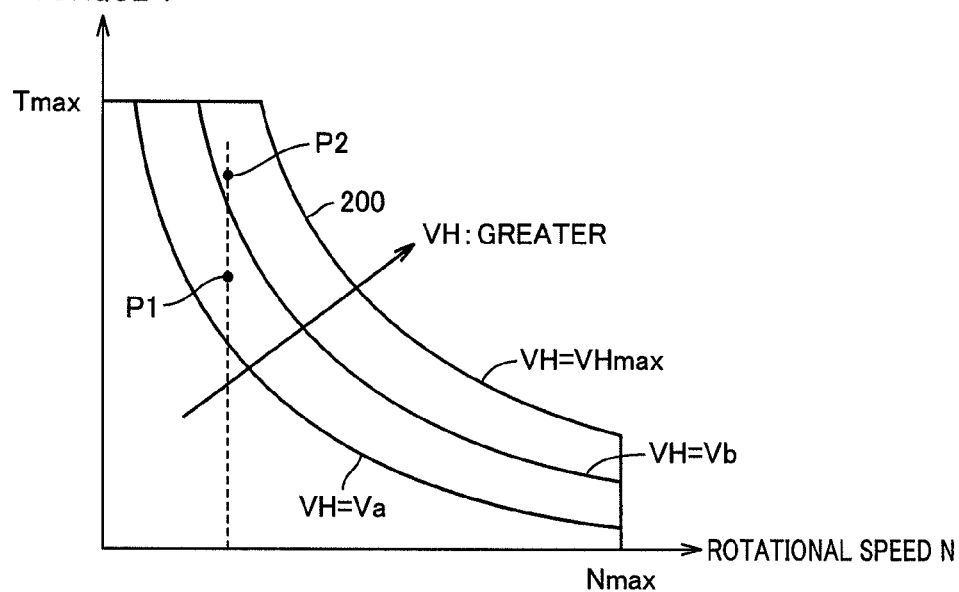
FIG. 2 is a conceptual diagram showing a relation between system voltage and an operable region of a motor generator.

FIG. 2 is a conceptual diagram showing a relation between the system voltage and an operable region of each of the motor generators.

Referring to FIG. 2, the operable region and an operating point of each motor generator are shown by a combination of rotational speed and torque. A maximum output line 200 represents a limit for the operable region when system voltage VH=Vmax (upper limit voltage). Maximum output line 200 has a portion restricted by T×N, which corresponds to output power, even when torque T<Tmax (maximum torque) and rotational speed N<Nmax (the maximum rotational speed). As system voltage VH decreases, the operable region becomes narrower.

For example, an operating point P1 can be achieved when system voltage VH=Va. When electrically powered vehicle 5 is accelerated from this state by a user's operation of the accelerator, a requested value for vehicle driving force increases. This increases the output torque of motor generator MG2, thus changing the operating point to P2. Operating point P2, however, cannot be attained unless system voltage VH is increased to Vb (Vb>Va).

A lower limit value (minimum required voltage VHmin) of system voltage VH at each operating point (rotational speed, torque) of each of motor generators MG1, MG2 can be found based on the relation between system voltage VH and boundaries of operating regions shown in FIG. 2.

Moreover, induced voltage corresponding to the rotational speed is generated in each of motor generators MG1, MG2. If this induced voltage becomes higher than system voltage VH, current in each of motor generators MG1, MG2 will be out of control. Thus, while electrically powered vehicle 5 is running at high speed with an increased rotational speed of each of motor generators MG1, MG2, minimum required voltage VHmin of system voltage VH increases.

From these standpoints, it is understood that, in correspondence with an operating point of each of motor generators MG1, MG2, minimum required voltage VHmin for ensuring an output in accordance with the operating point can be calculated in advance.

Figure 3:
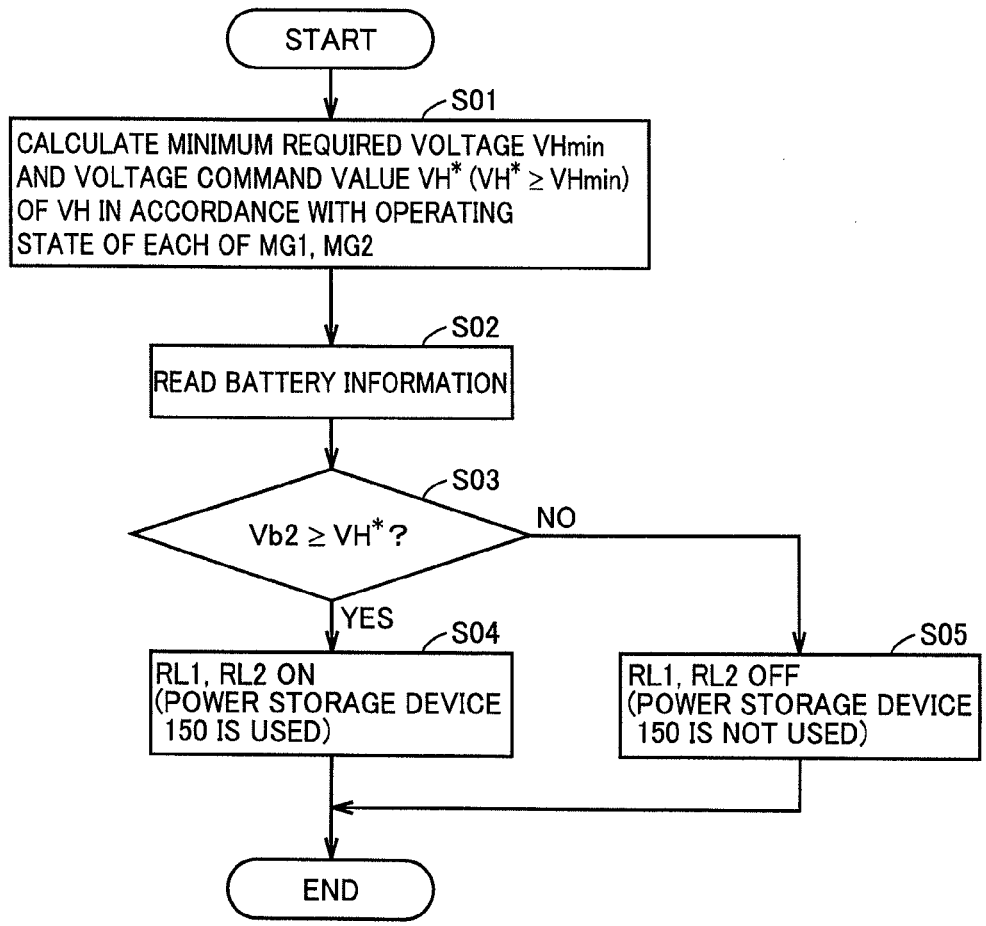
FIG. 3 is a flowchart for explaining one example of control processing in a power supply system according to the embodiment of the present invention.

FIG. 3 is a flowchart for explaining a first example of control processing in the power supply system according to an embodiment of the present invention. In FIG. 3 and other figures, processing at each step in each of the flowcharts shown below is carried out by software processing or hardware processing performed by control unit 300. Further, a series of control processing operations according to each of the flowcharts shown below is carried out by control unit 300 at every prescribed control cycle.

Referring to FIG. 3, at step S01, control device 300 calculates minimum required voltage VHmin based on an operating state of each of motor generators MG1, MG2, using the above-described map of required voltages. Control device 300 then sets voltage command value VH* in consideration of minimum required voltage VHmin. Voltage command value VH* is set to be not less than minimum required voltage VHmin. For example, when there is a voltage at which loss in power supply system 20 and load 10 is minimum, compared with when VH>VHmin, it is preferred that voltage command value VH* be set to that voltage, in favor of fuel efficiency. On the other hand, when it is desirable to actively use power storage device 150, voltage command value VH* is preferably lower, and thus, may be set to VH*=VHmin.

Accordingly, voltage command value VH* can be calculated in correspondence with an operating point of each of motor generators MG1, MG2, in consideration of minimum required voltage VHmin. For this reason, a map (voltage command value map) for calculating, in correspondence with an operating point of each of motor generators MG1, MG2, voltage command value VH* in accordance with the operating point, can be created in advance. The voltage command value map is stored in a memory (not illustrated) in control device 300. Accordingly, in the electrically powered vehicle according to the present embodiment, system voltage VH is variably controlled, in order to smoothly and efficiently drive each of motor generators MG1, MG2. That is, a voltage amplitude (pulse voltage amplitude) applied to each of motor generators MG1, MG2 is variably controlled in accordance with the operating state of each of motor generators MG1, MG2 (rotational speed and torque).

In step S02, control device 300 reads battery information based on the detection values from battery sensors 105, 155 shown in FIG. 1. The battery information contains at least battery voltage Vb2.

In step S03, control device 300 compares battery voltage Vb2 with voltage command value VH* set in step S01. When battery voltage Vb2 is not less than voltage command value VH* (when it is determined as YES in S03), control device 300 proceeds to the processing in step S04, where relays RL1, RL2 are turned ON. Power storage device 150 is thus connected to power supply line HPL.

Converter 110 controls charge and discharge of power storage device 100 so that current IL from power storage device 100 (equivalent to battery current Ib1) matches a prescribed current target value Ib1*, using a below-described method. In this way, charge and discharge power Pb1 of power storage device 100 can be adjusted in an arbitrary manner, and hence, charge and discharge power Pb2 of power storage device 150 can also be indirectly controlled. Consequently, power storage devices 100, 150 can be used in parallel to allow control of charge and discharge into and from load 10. When electric powered vehicle 5 is regeneratively braked in this state, power storage devices 100, 150 can be charged in parallel.

On the other hand, when battery voltage Vb2 is below voltage command value VH* (when it is determined as NO in S03), control device 300 proceeds to the processing in step 505, where relays RL1, RL2 are turned OFF. Power storage device 150 is thus disconnected from power supply line HPL. As described above, since voltage command value VH*≥VHmin, relays RL1, RL2 are reliably turned OFF, at least when Vb2<VHmin.

In this case, charge and discharge of electric power to and from load 10 is controlled using power storage device 100 only via converter 110. Converter 110 controls charge and discharge of power storage device 100 so that system voltage VH matches prescribed voltage command value VH*, using a below-described method. When electrically powered vehicle 5 is regeneratively braked in this state, only power storage device 100 is charged.

As described above, with the electric powered vehicle according to the present embodiment, in the power supply system using the plurality of power storage devices 100, 150, even though a converter is provided for power storage device 100 only, variable control of system voltage VH in accordance with the operating state of each of motor generators MG1, MG2 can be achieved. Consequently, a power supply system capable of extending the mileage obtained by the output of motor generators MG1, MG2 using electric power from the plurality of power storage devices 100, 150 can be configured simply and efficiently.

In particular, a high-voltage region of system voltage VH for handling acceleration of the vehicle and the like can be attained by disconnecting power storage device 150, whose output voltage is lower than the voltage command value (minimum required voltage), from power supply line HPL, and stepping up the output voltage of power storage device 100 with converter 110. Furthermore, when the output voltage of power storage device 150 is higher than the voltage command value (minimum required voltage) and power storage device 150 can be used, power storage devices 100, 150 can be used in parallel. In this way, electric power can be supplied to motor generators MG1, MG2 with the effective use of the plurality of power storage devices 100, 150, so that the power supply system can be configured to be smaller and efficiently at low cost.

(Controlling Voltage Conversion of Converter)

As described above, in power supply system 20 according to the present embodiment, a first mode in which power storage device 150 is used or a second mode in which power storage device 150 is not used is selected. For each of the first and second modes, control device 300 controls the voltage conversion operation at converter 110 as follows.

Figure 4:
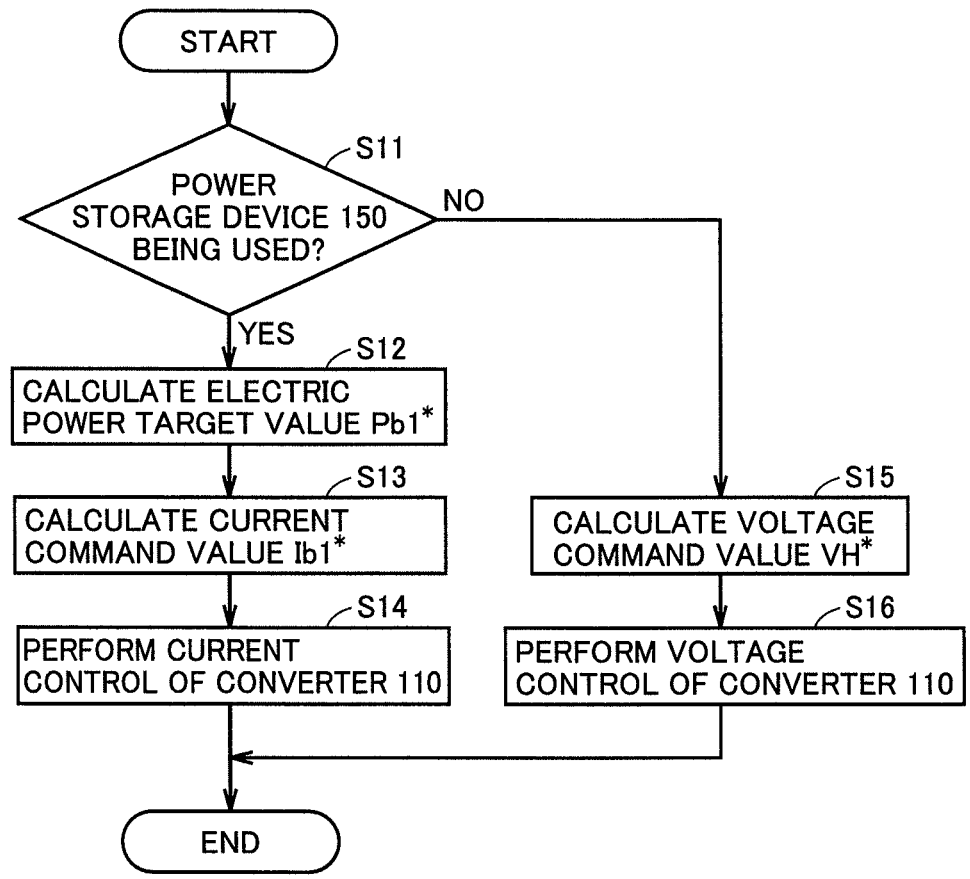
FIG. 4 is a flowchart for explaining control processing for a converter in the power supply system according to the embodiment of the present invention.

FIG. 4 is a flowchart for explaining control processing for the converter in the power supply system according to the embodiment of the present invention.

Referring to FIG. 4, control device 300 determines in step S11 whether the first mode in which power storage device 150 is used is selected or not. Where the first mode in which power storage device 150 is used is selected (when it is determined as YES in step S11), control device 300 calculates in step S12 an electric power target value (that is, a target value of charge and discharge power Pb1 of power storage device 100) Pb1* to be shared by power storage device 100, of the electric power supplied from power supply system 20 to load 10.

Here, in the first mode in which power storage device 150 is used, power storage devices 100, 150 are used in parallel. Hence, a sum of charge and discharge power Pb1 of power storage device 100 and charge and discharge power Pb2 of power storage device 150 corresponds to the electric power charged to load 10 and discharged from power supply system 20. This charge and discharge power of load 10 includes electric power Pg generated/consumed by motor generator MG1 and electric power Pm generated/consumed by motor generator MG2; therefore, a relation between charge and discharge power Pb1 of power storage device 100 and charge and discharge power Pb2 of power storage device 150, and the charge and discharge power of load 10 is expressed by the following equation (1):

$$Pb1+Pb2=Pg+Pm \quad (1)$$

When power storage devices 100, 150 are being used in parallel, charge and discharge power Pb2 of power storage device 150 is determined along with the control of charge and discharge of power storage device 100 by converter 110. That is, charge and discharge power Pb2 of power storage device 150 is determined by circumstances. Thus, in the first mode, control device 300 controls converter 110 so that the electric power to be shared by power storage device 100 (charge and discharge power Pb1), of the electric power supplied from power supply system 20 to load 10, becomes prescribed electric power target value Pb1*. In this way, charge and discharge power Pb1 of power storage device 100 can be adjusted in an arbitrary manner, and hence, charge and discharge power Pb2 of power storage device 150 can also be indirectly controlled. Consequently, electric power can be supplied to motor generators MG1, MG2 through cooperative use of power storage devices 100, 150.

Specifically, control device 300 calculates electric power target value Pb1* in step S12, and then in step S13, divides electric power target value Pb1* by battery voltage Vb1 of power storage device 100 to calculate current command value Ib1* of power storage device 100. Then in step S14, control device 300 controls converter 110 so that current IL from power storage device 100 becomes current command value Ib1*. In this way, converter 110 performs the voltage conversion operation in accordance with the current control, in order to achieve the electric power distribution at power storage device 100.

On the other hand, when the second mode in which power storage device 150 is not used is selected (when it is determined as NO in step S11), control device 300 calculates voltage command value VH* in step S15. The calculation of voltage command value VH* is executed by the processing shown in step S01 in FIG. 3.

In step S16, control device 300 controls converter 110 so that system voltage VH becomes voltage command value VH*. Converter 110 therefore performs the voltage conversion operation in accordance with the voltage control, so as to stabilize system voltage VH.

Figure 5:
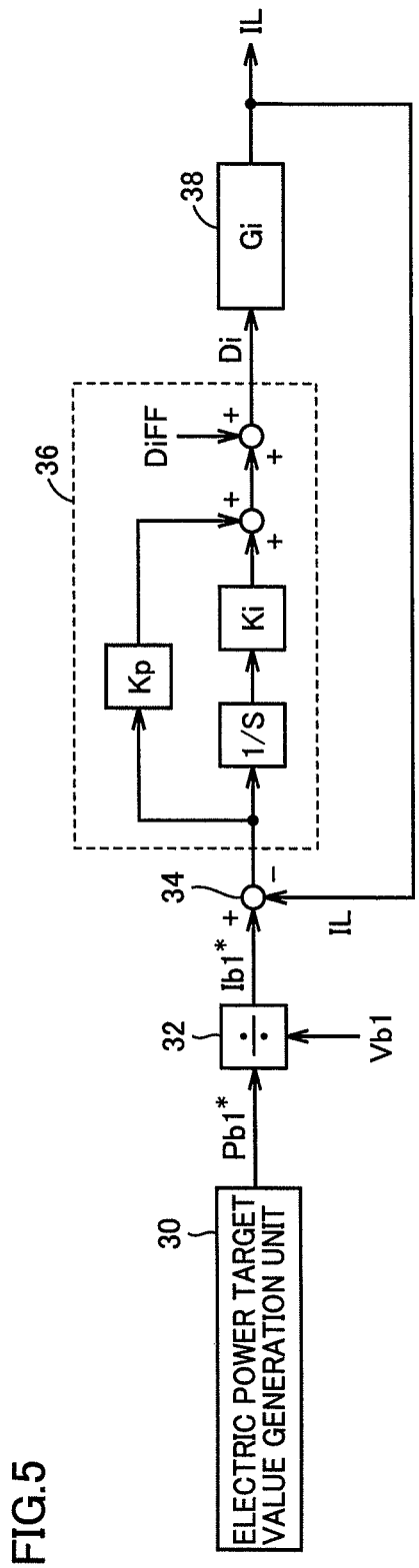
FIG. 5 is a diagram for illustrating an exemplary configuration of a control block for implementing current control of a converter in a control device.

FIG. 5 is a diagram for illustrating an exemplary configuration of a control block for implementing current control of converter 110 in control device 300.

Referring to FIG. 5, control device 300 includes, as a configuration for performing the current control of converter 110, an electric power target value generation unit 30, a division unit 32, a subtraction unit 34, a PI control unit 36, and a transfer function (Gi) 38.

Electric power target value generation unit 30 calculates electric power target value Pb1* of power storage device 100 within a range of electric power in which power storage device 100 can be charged and discharged. It is noted that the range of electric power in which power storage device 100 can be charged and discharged is defined by a charge power upper limit value and a discharge power upper limit value.

Division unit 32 divides electric power target value Pb1* by battery voltage Vb1 of power storage device 100 to calculate current target value Ib1* of power storage device 100, and outputs the result to subtraction unit 34.

Subtraction unit 34 calculates a current deviation ΔIL from a difference between current target value Ib1* and current IL, and outputs the result to PI control unit 36. PI control unit 36 generates a PI output corresponding to current deviation ΔIL in accordance with a prescribed proportional gain and a prescribed integral gain, and outputs the PI output to transfer function 38. PI control unit 36 constitutes a current feedback control element.

Specifically, PI control unit 36 includes a proportional element (P), an integral element (I), and an addition unit. The proportional element multiplies current deviation ΔIL by a prescribed proportional gain Kp and outputs the result to the addition unit, and the integral element integrates current deviation ΔIL with a prescribed integral gain Ki (integral time: 1/Ki) and outputs the result to the addition unit. The addition unit then adds the outputs from the proportional element and the integral element to generate a PI output. This PI output corresponds to a feedback control amount for implementing the current control. PI control unit 36 generates a duty ratio command value Di for the current control, in accordance with a sum of the feedback control amount and a feedforward control amount DiFF. Duty ratio command value Di is a control command that defines on-duty of switching element Q2 (FIG. 1) of converter 110 in the current control. Feedforward control amount DiFF in the current control is set in accordance with a difference in voltage between voltage command value VH* and voltage Vb1 of power storage device 100. Transfer function (Gi) 38 is equivalent to a transfer function of converter 110 with respect to power storage device 100 that operates as a current source.

Figure 6:
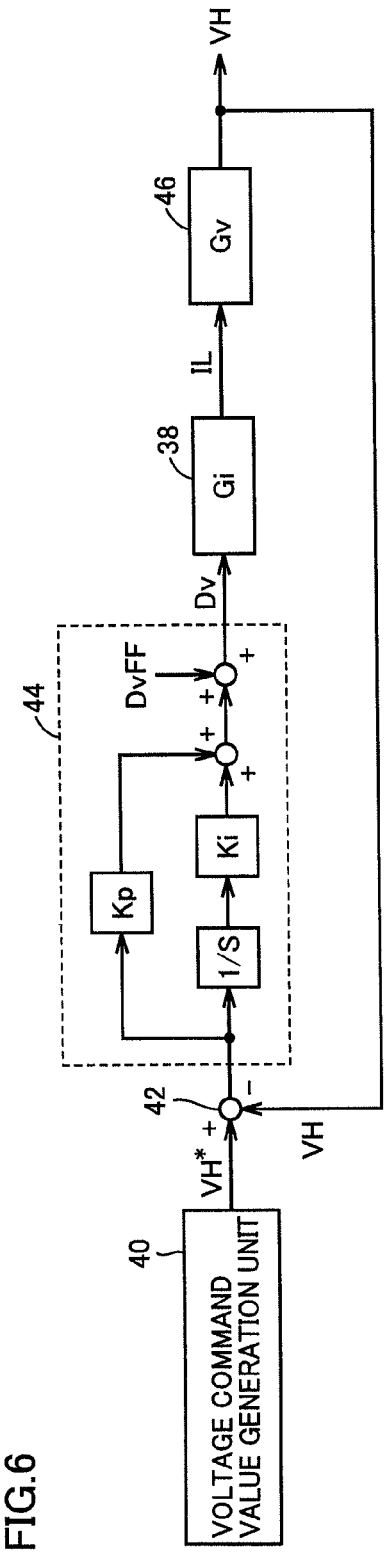
FIG. 6 is a diagram for illustrating an exemplary configuration of a control block for implementing voltage control of the converter in the control device.

FIG. 6 is a diagram for illustrating an exemplary configuration of a control block for implementing voltage control of converter 110 in control device 300.

Referring to FIG. 6, control device 300 includes, as a configuration for performing the voltage control of converter 110, a voltage command value generation unit 40, a subtraction unit 42, a PI control unit 44, a transfer function (Gi) 38, and a transfer function (Gv) 46.

Voltage command value generation unit 40 sets voltage command value VH* based on the operating state of each of motor generators MG1, MG2. As explained with FIG. 2, voltage command value generation unit 40 calculates minimum required voltage VHmin based on the operating state of each of motor generators MG1, MG2, and sets voltage command value VH* in consideration of minimum required voltage VHmin calculated.

Subtraction unit 42 calculates a voltage deviation ΔVH from a difference between voltage command value VH* and system voltage VH, and outputs the result to PI control unit 44. PI control unit 44 generates a PI output corresponding to voltage deviation ΔVH in accordance with a prescribed proportional gain and a prescribed integral gain, and outputs the PI output to transfer function 38. PI control unit 44 constitutes a voltage feedback control element.

Specifically, PI control unit 44 includes a proportional element, an integral element, and an addition unit. The proportional element multiplies voltage deviation ΔVH by a prescribed proportional gain Kp and outputs the result to the addition unit, and the integral element integrates voltage deviation ΔVH with a prescribed integral gain Ki (integral time: 1/Ki) and outputs the result to the addition unit. The addition unit then adds the outputs from the proportional element and the integral element to generate a PI output. This PI output corresponds to a feedback control amount for implementing the voltage control. PI control unit 44 generates a duty ratio command value Dv for the voltage control, in accordance with a sum of the feedback control amount and a feedforward control amount DvFF. Duty ratio command value Dv is a control command that defines on-duty of switching element Q2 (FIG. 1) of converter 110 in the voltage control. Feedforward control amount DvFF in the voltage control is set in accordance with a difference in voltage between voltage command value VH* and voltage Vb1 of power storage device 100. Transfer function (Gi) 38 and transfer function (Gv) 46 are equivalent to transfer functions of converter 110 with respect to power storage device 100 that operates as a voltage source.

As described above, converter 110 performs the voltage conversion operation in accordance with the current control, in the first mode in which power storage device 150 is used, and performs the voltage conversion operation in accordance with the voltage control, in the second mode in which power storage device 150 is not used. Thus, each time switching between the first mode and the second mode occurs, switching between the current control and the voltage control occurs in converter 110, and the switched control is applied. At the timing at which the control is switched, therefore, system voltage VH that is the output voltage of converter 110 may fluctuate.

Therefore, in the power supply system according to the embodiment of the present invention, at the time of switching between the current control and the voltage control, the output of the integral element (integral term) of the feedback control elements in the control before switching is taken over as an initial value of the integral element of the feedback control elements in the control after switching.

Specifically, in the control block shown in FIG. 5, PI control unit 36 calculates a feedback control amount ILfb of current IL, based on a control calculation based on current deviation ΔIL, and typically, based on a proportional integral (PI) calculation in accordance with the following equation (2):

$$ILfb = ILfb(P) + ILfb(I)$$
$$= Kp \cdot \Delta IL + \Sigma(Ki \cdot \Delta IL)$$
(2)

In equation (2), ILfb (P) is the proportional term, and ILfb (I) is the integral term. Moreover, ΔIL is the current deviation in a present control cycle, and Kp and Ki are feedback gains.

At the time of switching from the first mode to the second mode, that is, at the time of switching from the current control to the voltage control, control device 300 uses integral term ILfb (I) in equation (2) as an initial value of the integral element in PI control unit 44 of the control block shown in FIG. 6. That is, at the time of switching from the current control to the voltage control, PI control unit 44 outputs a value obtained by adding a product of current deviation ΔIL and integral gain Ki in the present control cycle to an integral term calculated in a previous control cycle, as the integral term in the present control cycle. In this way, by taking over the integral term in the feedback control amount between PI control unit 36 and PI control unit 44, it is possible to prevent discontinuity of the feedback control amount at the time of switching the control. Consequently, the occurrence of fluctuations in system voltage VH can be avoided.

A configuration of the control block for implementing switching between the current control and the voltage control of converter 110 in control device 300 will be described hereinafter.

Figure 7:
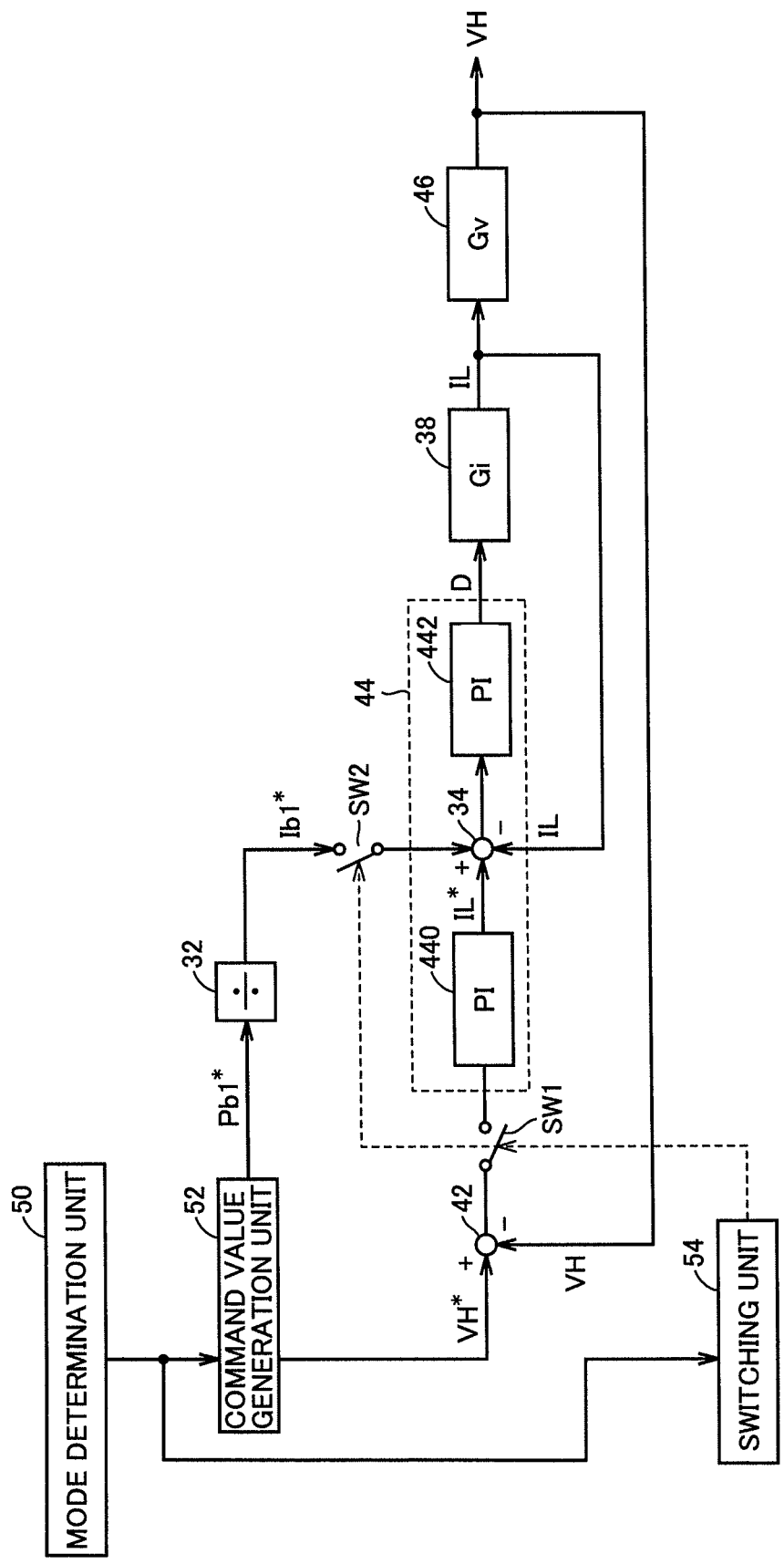
FIG. 7 is a diagram for illustrating an exemplary configuration of a control block for implementing switching between current control and voltage control of the converter in the control device.

FIG. 7 is a diagram for illustrating an exemplary configuration of the control block for implementing switching between the current control and the voltage control of converter 110 in control device 300.

Referring to FIG. 7, control device 300 includes a mode determination unit 50, a command value generation unit 52, a switching unit 54, a division unit 32, a subtraction unit 42, a PI control unit 44, transfer functions 38, 46, and switches SW1, SW2.

When one of the first mode in which power storage device 150 is used and the second mode in which power storage device 150 is not used is selected in accordance with the flowchart shown in FIG. 3, mode determination unit 50 selects one of the current control and the voltage control in accordance with the selected mode. Mode determination unit 50 generates a signal indicating which of the current control and the voltage control is selected, and transmits the signal to command value generation unit 52 and switching unit 54.

Command value generation unit 52 generates one of electric power target value Pb1* and voltage command value VH*, in accordance with the control selected by mode determination unit 50. Specifically, where the current control is selected, command value generation unit 52 calculates electric power target value Pb1* of power storage device 100 within a range of electric power in which power storage device 100 can be charged and discharged. On the other hand, where the voltage control is selected, command value generation unit 52 sets voltage command value VH* based on the operating state of each of motor generators MG1, MG2. That is, command value generation unit 52 functions both as electric power target value generation unit 30 shown in FIG. 5 and voltage command value generation unit 40 shown in FIG. 6.

In the configuration shown in FIG. 7, subtraction unit 42, PI control unit 44, transfer function (Gi) 38, and transfer function (Gv) 46 form a voltage feedback loop for performing the voltage control of converter 110. This voltage feedback loop has the same control structure as the control block shown in FIG. 6.

Specifically, subtraction unit 42 calculates voltage deviation ΔVH from a difference between voltage command value VH* and system voltage VH, and outputs the result to PI control unit 44. PI control unit 44 includes a voltage control calculation unit 440, subtraction unit 34, and a current control calculation unit 442.

Voltage control calculation unit 440 carries out a control calculation (proportional integral calculation) for making system voltage VH match voltage command value VH*, using voltage deviation ΔVH. Voltage control calculation unit 440 then outputs the calculated control amount as current command value IL*. That is, voltage control calculation unit 440 generates current command value IL* corresponding to voltage deviation ΔVH by carrying out the control calculation for making system voltage VH match voltage command value VH*.

Subtraction unit 34 calculates current deviation ΔIL from a difference between current IL and current command value IL* output from voltage control calculation unit 440, and outputs the result to current control calculation unit 442.

Current control calculation unit 442 carries out a control calculation (proportional integral calculation) for making current IL match current command value IL*, using current deviation ΔIL. Current control calculation unit 442 then generates a duty ratio command value D for the voltage control, in accordance with a sum of the calculated control amount and a feedforward control amount. That is, current control calculation unit 442 carries out a control calculation for making current IL match current command value IL*, taking a PI output of voltage control calculation unit 440 as current command value IL*. In this way, if a deviation of system voltage VH from current command value VH* occurs, current command value IL* is corrected to remove the deviation, and the current control is executed so that current IL matches current command value IL*.

In the voltage feedback loop shown in FIG. 7, subtraction unit 42, current control calculation unit 442, subtraction unit 34, current control calculation unit 442, and transfer functions 38, 46 form a main loop for making system voltage VH match voltage command value VH*, and subtraction unit 34, current control calculation unit 442, and transfer function 38 form a minor loop for making current IL match current command value IL*.

In control device 300, division unit 32 is added to this minor loop, so that the minor loop also functions as a current feedback loop for performing the current control of converter 110. This current feedback loop has the same control structure as the control block shown in FIG. 5.

Specifically, division unit 32 divides electric power target value Pb1* by battery voltage Vb1 of power storage device 100 to calculate current target value Ib1* of power storage device 100, and outputs the result to subtraction unit 34.

Subtraction unit 34 calculates current deviation ΔIL from a difference between current target value Ib1* and current IL, and outputs the result to current control calculation unit 442.

Current control calculation unit 442 carries out a control calculation (proportional integral calculation) for making current IL match current command value IL*, using current deviation ΔIL. Current control calculation unit 442 then generates a duty ratio command value D for the current control, in accordance with a sum of the calculated control amount and a feedforward control amount. That is, current control calculation unit 442 carries out a control calculation for making current IL match current command value IL*, taking current IL calculated from electric power target value Pb1* as voltage command value IL*. In this way, if a deviation of charge and discharge power Pb1 of power storage device 100 from electric power target value Pb1* occurs, current command value IL* is corrected to remove the deviation, and the current control is executed so that current IL matches current command value IL*.

Switch SW1 is provided between subtraction unit 42 and voltage control calculation unit 440 in the above-described voltage feedback loop. Switch SW2 is provided between division unit 32 and subtraction unit 34 in the above-described current feedback loop. ON/OFF of each of switches SW1, SW2 is controlled by a control signal from switching unit 54.

Specifically, switching unit 54 generates a control signal for turning ON or OFF each of switches SW1, SW2, in accordance with the control selected by mode determination unit 50. When the current control is selected by mode determination unit 50, switching unit 54 generates a control signal for turning ON switch SW2 while turning OFF switch SW1. Therefore, at the time of the current control, division unit 32 and subtraction unit 34 are connected to form the above-described current feedback loop.

On the other hand, when the voltage control is selected by mode determination unit 50, switching unit 54 generates a control signal for turning OFF switch SW2 while turning ON switch SW1. Therefore, at the time of the voltage control, subtraction unit 42 and voltage control calculation unit 440 are connected to form the above-described voltage feedback loop.

Moreover, with the configuration in which the minor loop in this voltage feedback loop functions also as the current feedback loop, at the time of switching from the current control to the voltage control, the control amount (integral term) calculated before switching by current control calculation unit 442 by means of the control calculation (proportional integral calculation) of current deviation ΔIL can be taken over as an initial value of a control amount (integral term) calculated after switching by current control calculation unit 442 by means of the control calculation of current deviation ΔIL. In this way, at the time of switching from the first mode in which power storage device 100 is used to the second mode in which power storage device 150 is not used, the occurrence of fluctuations in system voltage VH can be avoided.

Furthermore, at the time of switching from the voltage control to the current control, in addition to taking over the control amount (integral term) in current control calculation unit 442 as the initial value of the control amount in the current control, a final value of current command value IL* output from voltage control calculation unit 440 can be taken over to current control calculation unit 442. In this way, also at the time of switching from the second mode to the first mode, the occurrence of fluctuations in system voltage VH can be avoided.

Figure 8:
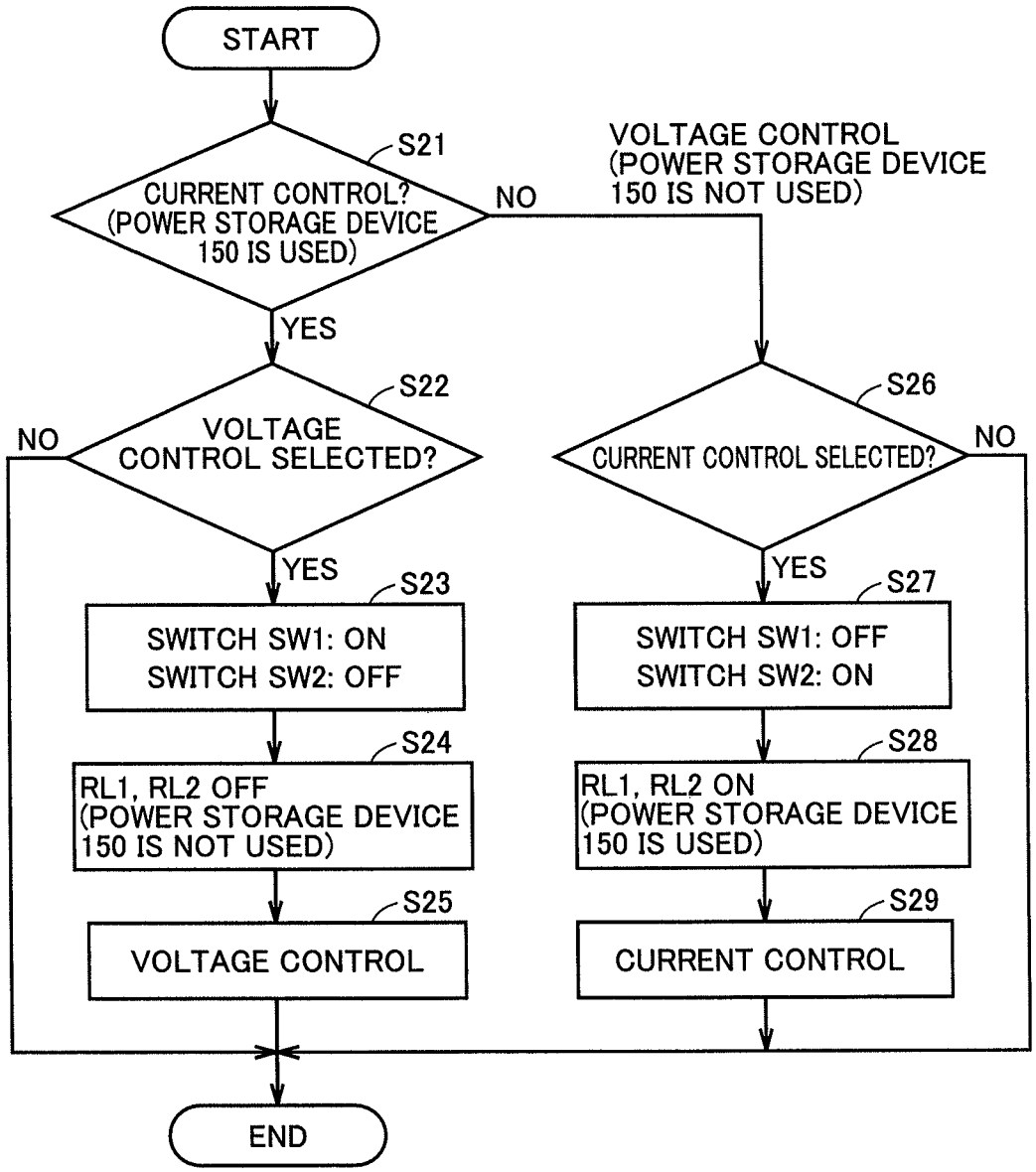
FIG. 8 is a flowchart showing a procedure of processing by the control device for implementing switching between current control and voltage control of the converter.

FIG. 8 is a flowchart showing a procedure of processing by control device 300 for implementing the above-described switching between the current control and the voltage control of converter 110. Although each of the steps in the flowchart shown in FIG. 8 is basically implemented by software processing by control device 300, it may also be implemented by hardware processing, such as an electronic circuit provided in control device 300.

Referring to FIG. 8, control device 300 determines in step S21 whether the first mode in which power storage device 150 is used is selected or not, that is, determines whether converter 110 is being controlled in accordance with the current control or not.

Where the first mode is selected, that is, where converter 110 is being controlled in accordance with the current control (when it is determined as YES in step S21), control device 300 next determines in step S22 whether the second mode is selected or not, that is, determines whether the voltage control is selected or not. Where the second mode is not selected (when it is determined as NO in step S22), the processing is terminated without thereafter performing the processing of switching the control.

On the other hand, where the voltage control is selected in accordance with the selection of the second mode (when it is determined as YES in step S22), control device 300 generates in step S23 a control signal for turning OFF switch SW2 while turning ON switch SW1, and outputs the control signal to switches SW1, SW2. Moreover, control device 300 proceeds to the processing in step S24 to turn OFF relays RL1, RL2. Once power storage device 150 is disconnected from power supply line HPL and becomes out of use, control device 300 controls converter 110 in accordance with the voltage control in step S25.

On the other hand, where the second mode is selected, that is, where converter 110 is being controlled in accordance with the voltage control (when it is determined as NO in step S21), control device 300 next determines in step S26 whether the first mode is selected or not, that is, determines whether the current control is selected or not. Where the first mode is not selected (when it is determined as NO in step S26), the processing is terminated without thereafter performing the processing of switching the control.

On the other hand, where the current control is selected in accordance with the selection of the first mode (when it is determined as YES in step S26), control device 300 generates in step S27 a control signal for turning ON switch SW2 while turning OFF switch SW1, and outputs the control signal to switches SW1, SW2. Moreover, control device 300 proceeds to the processing in step S28 to turn ON relays RL1, RL2. Once power storage device 150 is connected to power supply line HPL, control device 300 controls converter 110 in accordance with the current control in step S29.

As described above, according to the embodiment of this invention, in the power supply system provided with the plurality of power storage devices 100, 150, even though a converter is provided for power storage device 100 only, converter 110 is controlled in accordance with the current control so that the electric power to be shared by power storage device 100 becomes a prescribed electric power target value, which allows charge and discharge power of power storage device 150 to be also indirectly controlled. In this way, electric power can be supplied to the load through cooperative use of power storage devices 100, 150. Consequently, electric power can be supplied to the load with the effective use of the plurality of power storage devices 100, 150, so that the power supply system can be configured to be smaller and efficiently at low cost.

Furthermore, at the time of switching converter 110 between the current control and the voltage control in accordance with switching between use and disuse of power storage device 150, the output of the integral element (integral term) of the feedback control elements in the control before switching is taken over as an initial value of the integral element of the feedback control elements in the control after switching. Consequently, the occurrence of fluctuations in system voltage VH at the time of switching the control can be avoided.

It is noted that the configuration of load 10 (i.e., the drive system) of electrically powered vehicle 5 shown in FIG. 1 is not limited to that illustrated herein. That is, the present invention is similarly applicable to an electrically powered vehicle on which an electric motor for running is mounted, such as an electric vehicle, a fuel cell vehicle, or the like. It is also described for confirmation that load 10 is not limited to the drive system that generates vehicle driving force, but is also applicable to an apparatus that consumes electric power.

It is to be understood that the embodiments disclosed herein are only by way of example, and not to be taken by way of limitation. The scope of the present invention is defined by the terms of the claims, rather than the description above, and is intended to include any modifications within the scope and meaning equivalent to the terms of the claims.

Industrial Applicability

This invention is applicable to a power supply system on which a plurality of power storage devices are mounted.

Reference Signs List

5: electric powered vehicle; 10: load; 20: power supply system; 30: electric power target value generation unit; 32: division unit; 34, 42: subtraction unit; 36, 44: PI control unit; 38, 46: transfer function; 40; voltage command value generation unit; 50: mode determination unit; 52: command value generation unit; 54: switching unit; 100, 150: power storage device; 105, 155: battery sensor; 110: converter; 120: inverter; 160, 230, 240: current sensor; 170, 180: voltage sensor; 190: system main relay; 220: engine; 250: power split device; 260: driving wheel; 270, 280: rotation angle sensor; 300: control device; 440: voltage control calculation unit; 442: current control calculation unit; MG1, MG2: motor generator; SMR1-SMR3, RL1-RL3: relay.

The invention claimed is:

1. A power supply system that supplies electric power to a load comprising:
   a first power storage device;
   a second power storage device;
   a power line for transmitting electric power input and output to and from said load;
   a converter for executing bidirectional DC voltage conversion between said first power storage device and said power line;
   a switch connected between said second power storage device and said power line; and
   a control device that controls ON/OFF of said switch and said converter,
   when said switch is OFF, said control device performing voltage control of said converter so that a voltage value of said power line becomes a voltage command value, and when said switch is ON, said control device performing current control of said converter so that a current value of said power storage device becomes a current command value, wherein
   said control device includes:
   a switching unit that switches ON and OFF of said switch in accordance with an operating state of said load;
   a voltage control unit that performs voltage control of said converter in accordance with an output of a voltage feedback control element including at least an integral element that integrates a deviation of the voltage value of said power line from said voltage command value; and a current control unit that performs current control of said converter in accordance with an output of a current feedback control element including at least an integral element that integrates a deviation of the current value of said first power storage device from said current command value, wherein when switching said switch from ON to OFF, said voltage control unit takes over from said current control unit the output of the integral element in said current feedback control element, as an initial value of the integral element in said voltage feedback control element.

2. The power supply system according to claim 1, wherein when switching said switch from OFF to ON, said current control unit takes over from said voltage control unit the output of the integral element in said voltage feedback control element, as an initial value of the integral element in said current feedback control element.

3. The power supply system according to claim 2, wherein said voltage control unit includes:

a voltage control calculation unit that performs a proportional integral calculation of the deviation of the voltage value of said power line from said voltage command value, and outputs a calculated control amount as said current command value; and a current control calculation unit that performs a proportional integral calculation of the deviation of the current value of said first power storage device from said current command value output from said voltage control calculation unit, and outputs a calculated control amount as a duty ratio command value to said converter, wherein when said switch is ON, said current control calculation unit is configured to receive said current command value set in accordance with an electric power target value to be shared by said first power storage device, in place of said current command value output from said voltage control calculation unit, thereby functioning as said current control unit.

4. The power supply system according to claim 1, wherein said voltage control unit includes:

a voltage control calculation unit that performs a proportional integral calculation of the deviation of the voltage value of said power line from said voltage command value, and outputs a calculated control amount as said current command value; and a current control calculation unit that performs a proportional integral calculation of the deviation of the current value of said first power storage device from said current command value output from said voltage control calculation unit, and outputs a calculated control amount as a duty ratio command value to said converter, wherein when said switch is ON, said current control calculation unit is configured to receive said current command value set in accordance with an electric power target value to be shared by said first power storage device, in place of said current command value output from said voltage control calculation unit, thereby functioning as said current control unit.

5. The power supply system according to claim 1, wherein said load includes an electric motor that generates vehicle driving force by receiving electric power supplied from said power supply system, said voltage control unit calculates a minimum required voltage of said power line in accordance with a torque and a rotational speed of said electric motor and sets said voltage command value in a range not lower than said minimum required voltage, and said current control unit calculates required electric power of said electric motor in accordance with the torque and the rotational speed of said electric motor and determines an electric power target value to be shared by said first power storage device in accordance with the required electric power of said electric motor, and sets said current command value by dividing said electric power target value by a voltage of said first power storage device.

6. A method for controlling a power supply system that supplies electric power to a load, said power supply system including:
a first power storage device;
a second power storage device;
a power line for transmitting electric power input and output to and from said load;
a converter for executing bidirectional DC voltage conversion between said first power storage device and said power line; and
a switch connected between said second power storage device and said power line, said method comprising the steps of:
switching ON and OFF of said switch in accordance with an operating state of said load;
when said switch is OFF, performing voltage control of said converter so that a voltage value of said power line becomes a voltage command value; and
when said switch is ON, performing current control of said converter so that a current value of said first power storage device becomes a current command value, wherein said performing voltage control performs voltage control of said converter in accordance with an output of a voltage feedback control element including at least an integral element that integrates a deviation of the voltage value of said power line from said voltage command value, said performing current control performs current control of said converter in accordance with an output of a current feedback control element including at least an integral element that integrates a deviation of the current value of said first power storage device from said current command value, and when switching said switch from ON to OFF, said performing voltage control takes over from said performing current control the output of the integral element in said current feedback control element, as an initial value of the integral element in said voltage feedback control element.

* * * * *